United States Patent [19]
Hess et al.

[11] Patent Number: 5,905,311
[45] Date of Patent: May 18, 1999

[54] INTEGRATED HYDROELECTRIC UNIT

[75] Inventors: Neil E. Hess; David R. Light, both of York, Pa.

[73] Assignee: Voith Hydro, Inc., York, Pa.

[21] Appl. No.: 08/792,935

[22] Filed: Jan. 22, 1997

[51] Int. Cl.[6] .................................................. F03B 3/00
[52] U.S. Cl. ........................ 290/52; 415/208.1; 60/398
[58] Field of Search ................................. 290/52; 415/1, 415/163, 208.1; 60/398

[56] References Cited

U.S. PATENT DOCUMENTS

| | | | |
|---|---|---|---|
| 3,658,436 | 4/1972 | Oishi et al. ................................. | 415/1 |
| 3,793,698 | 2/1974 | Goings ...................................... | 29/401 |
| 4,023,866 | 5/1977 | Gatierrez Atencio ...................... | 308/77 |
| 4,380,401 | 4/1983 | Chacour et al. .......................... | 384/438 |
| 4,388,004 | 6/1983 | Bellati ...................................... | 384/397 |
| 4,674,279 | 6/1987 | Ali et al. ................................... | 60/398 |
| 4,754,155 | 6/1988 | Obermeyer ................................ | 290/52 |
| 5,261,787 | 11/1993 | Morgunov ............................. | 415/208.1 |
| 5,322,412 | 6/1994 | Erlach ........................................ | 415/1 |
| 5,364,229 | 11/1994 | Fujihara et al. ......................... | 415/163 |
| 5,754,446 | 5/1998 | Fisher, Jr. et al. ...................... | 364/494 |
| 5,780,935 | 7/1998 | Kao .......................................... | 290/52 |

*Primary Examiner*—Nestor Ramirez
*Assistant Examiner*—Nicholas Ponomarenko
*Attorney, Agent, or Firm*—Foley & Lardner

[57] ABSTRACT

A hydroelectric installation comprises an electric generator and associated hydro-turbine. The hydro-turbine comprises a runner rotatably mounted within a casing or passageway in which water flows between an upper elevation source in fluid communication with an inlet port and a lower elevation discharge region or outlet port. The turbine also includes a water closure component or head cover. The generator is laterally supported by a guide bearing attached to a turbine component thereby eliminating the use of generator guide bearing brackets, bridges and the like, and reducing the complexity of the concrete structures surrounding the unit.

22 Claims, 3 Drawing Sheets

INTEGRATED HYDROELECTRIC UNIT

FIELD OF THE INVENTION

The present invention relates generally to hydroelectric turbine installations. More particularly, this invention pertains to hydroelectric units having a turbine and associated generator in which certain turbine components are used to provide lateral or radial support for the generator.

BACKGROUND OF THE INVENTION

Hydroelectric turbine installations of the type illustrated in FIG. 1 conventionally include a power generating unit having a longitudinal axis 10, the unit consisting of an electric generator 12 and associated hydro-turbine 14. The hydro-turbine comprises a runner 16 having a hub 18 and a plurality of runner blades 20 connected to the hub. The runner is rotatably mounted within a casing or passageway 22 in which water flows from an upper elevation source in fluid communication with an inlet port 24 to a lower elevation discharge region or outlet port 26. Water passing through the passageway imparts a rotating movement to the runner, which when transmitted to the generator causes the generator to produce electrical energy. Turbine 14 also includes various water closure components or covers 27 to contain the water so that it does not escapee and guide the water so that it can be utilized for the intended purposes. Hydro-electric installations also often include associated components such as wicket gates 28 which are designed to regulate the amount of water flowing through the passageway and, accordingly, the quantity of electrical energy produced by the generator.

For proper operation of the hydroelectric turbine installation the turbine will need to be securely positioned and rotatably guided within the passageway. As can be readily appreciated by those skilled in the art, accurately and reliably guiding the turbine in rotation within the passageway permits the reduction of dimensional clearances between the tip of the blades and the passageway. This will limit efficiency losses caused by water leaking between the passageway and the tip of the blades.

Similarly, the generator, which is connected to the turbine shaft 30, will have to be laterally guided relative to the passageway. The lateral guiding of the generator is typically achieved by a generator guide bearing 32 which is commonly attached to structural components such as guiding brackets or frames 34, or the like, these structural components being themselves anchored to concrete decks 36. The hydroelectric unit is also ordinarily supported in the direction of axis 10 by a thrust bearing 38. However, because of the size and weight of hydro-turbine installations, and to allow such installations to withstand the axial thrust applied to them by the water travelling through the passageway, the structural components and decks that guide and support the installation axially and radially will typically be relatively massive.

Furthermore, generator guide bearing brackets, bridges, or frames are typically disposed at a relatively significant distance from the inlet port 24 of the passageway. This will naturally increase the length and weight of the turbine shaft, necessitating the use of sturdy brackets, bridges, or frames to properly provide lateral support to the generator. This will also require massive concrete decks to separate the generator from the turbine.

In light of the foregoing, although it is widely recognized that hydro-electric turbine installations provide a very useful form of production of energy in certain cases the complexity and associated cost of these massive support brackets, decks, and other structures, or the space required to erect them, will prevent the otherwise desirable use of such installations. Accordingly, it has become highly desirable to provide effective ways to overcome these shortcomings without materially impairing the operating characteristics of these hydroelectric installations.

SUMMARY OF THE INVENTION

The present invention includes a hydroelectric installation having a turbine rotatable within a passageway through which water flows between an inlet port and an outlet port. The turbine comprises a runner having a hub extending in a region of the passageway proximate the outlet port, the hub being associated with a plurality of blades. The turbine also includes a turbine water closure component to contain and guide the water so that it can be utilized for the intended purposes. In accordance with one embodiment of the present invention, the turbine water closure component is connected to the passageway proximate the inlet port, and is configured so that a generator lateral support means can be attached thereto to provide lateral support to a generator associated with the turbine during rotation of the hub.

In accordance with another aspect of the present invention, the generator lateral support means is a guide bearing and the turbine water closure component is a turbine head cover, the guide bearing being connected to or received within the turbine head cover.

In accordance to yet another aspect of this invention, the water closure component includes a bearing support and basin connected to an upper region of the water closure component and configured to receive the generator lateral supporting means.

Other advantages of the invention will become apparent from the detailed description given hereinafter. It should be understood, however, that the detailed description and specific embodiments are given by way of illustration only since, from this detailed descriptions various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and.

DETAILED DESCRIPTION OF A PREFERRED EXEMPLARY EMBODIMENT

Figure 1:
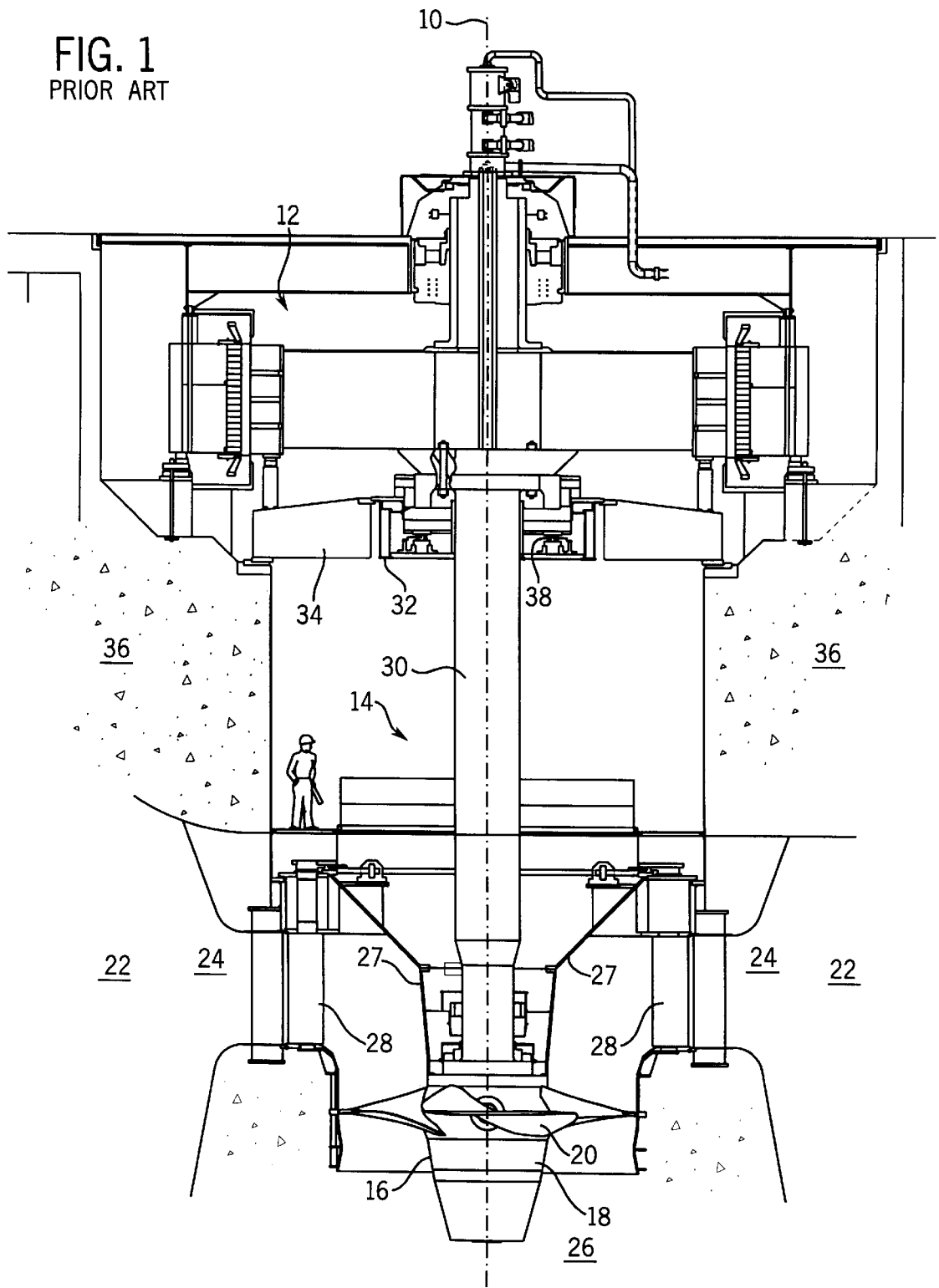
FIG. 1 is a front elevational view of a prior art representation of a hydroelectric installation in which the generator guide bearing is supported by a bridge disposed intermediate the generator and the turbine head cover.

Referring to the figures, a hydroelectric installation generally designated as 100 includes a longitudinal axis 102 extending between a first end 104 of installation 100 and an opposed downstream end 106. Installation 100 comprises a turbine generally designated as 108 rotatable within a passageway 110 through which water flows between an inlet port 112 and an outlet port 114. Turbine 108 includes a turbine runner 116 having a hub 118 extending in a region of passageway 110 proximate outlet port 114.

Hub 118 is associated with a plurality of blades 120 connected thereto. In certain cases, blades 120 will be adjustable in rotation relative to hub 118 about rotational axes 122. Installation 100 may also include stay vanes 124, and wicket gates (not shown) which may be adjusted in position to regulate the flow of water in passageway 110. Turbines having both blades 120 and wicket gates adjustable in position are commonly called Kaplan-type turbines.

While the present invention will be generically described with reference to a "turbine" and illustrated in the drawings as an axial flow turbine, those skilled in the art will readily appreciate that this invention is not limited to any particular turbine type or to a specific location of the turbine relative to the upper elevation and lower elevation water levels. Specifically, instead of an axial flow or Kaplan turbine as illustrated in the drawings, the turbine may be simply an axial flow machine, or a "Deriaz" type turbine (i.e., a turbine in which the blade axes 122 are inclined relative to installation axis 102). Alternatively, turbine 108 could be a propeller-type turbine, a diagonal or mixed flow turbine (i.e., a turbine in which the flow of water exiting the turbine has axial and radial components), a radial or Francis-type turbine (i.e., a turbine in which the water flows into the turbine from a direction essentially perpendicular to the turbine axis of rotation), or a Pelton or impulse-type turbine, whether any of the foregoing turbines are used in a pressure or siphon setting. The present invention may also be used with hydroelectric pumps such axial flow, diagonal or mixed flow, or centrifical pumps, or with reversible pump turbines as well. In those cases, installation 100 will be in the turbining mode to generate electricity when the water flows from inlet port 112 to outlet port 114. Conversely, in the pumping mode installation 100 will pump water back up to a higher elevation reservoir so that water can flow from outlet port 114 to inlet port 112.

Figure 2:
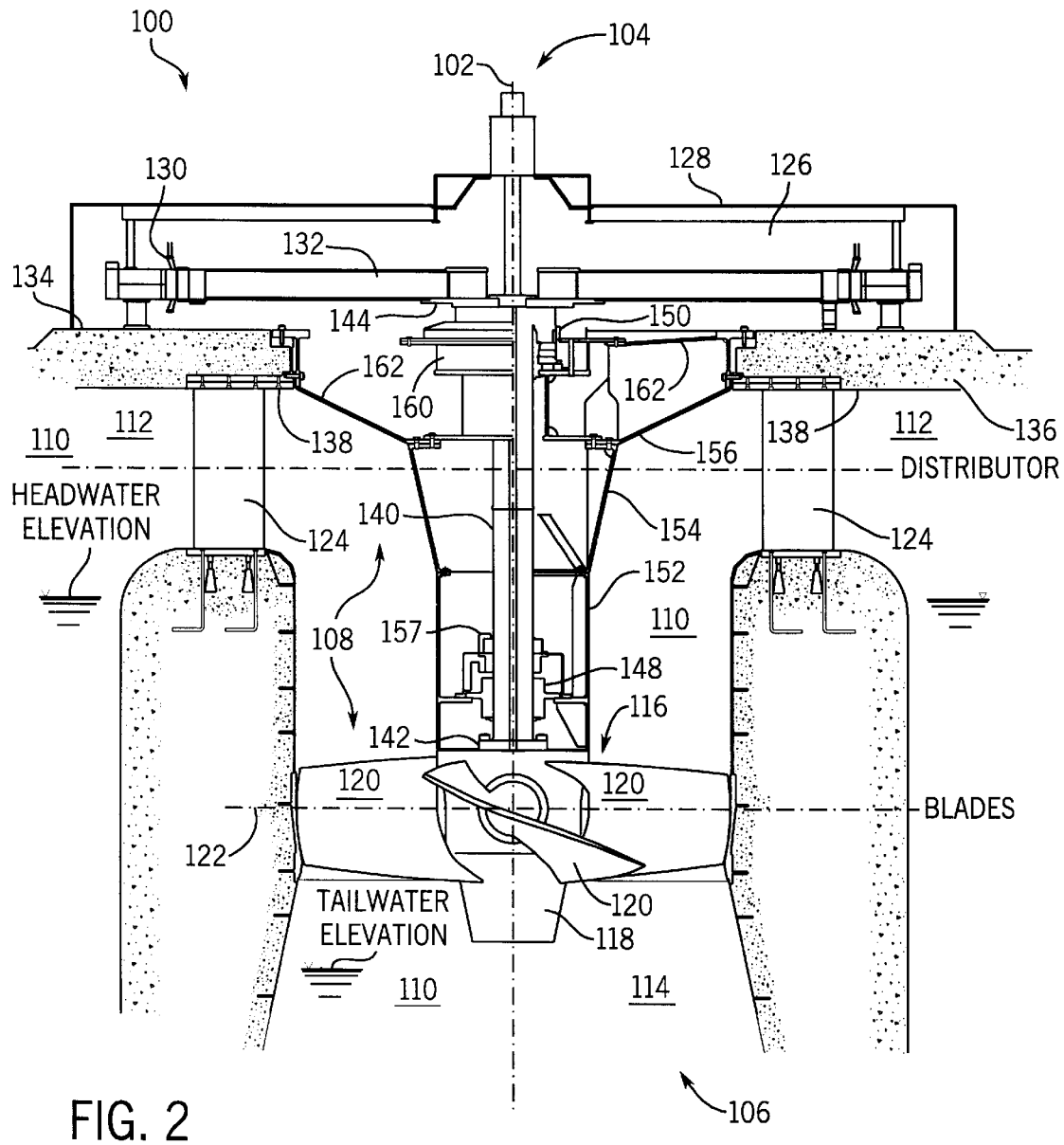
FIG. 2 is a front elevational view of the hydroelectric installation in accordance with the present invention in which lateral support to the generator is provided by a generator guiding means attached to the turbine head cover.

Hydroelectric installation 100 also includes a generator generally designated as 126 disposed outside passageway 110 and housed within a generator housing 128. Generator 126 comprises a stator 130 which is associated with a rotor 132 for the production of electrical energy. Stator 130 is supported in a vertical direction on an upper surface 134 of a deck 136, and as shown in FIG. 2, the lower region 138 of deck 136 forming inlet port 112.

Rotor 132 is connected to turbine 108 via turbine shaft 140 in ways commonly known in the art so that, in the turbining mode, water flowing through passageway 110 from inlet port 112 to outlet port 114 will impart a rotating movement to runner 116. This rotating movement will in turn cause rotor 132 to rotate relative to stator 130 thereby generating electrical energy. Conversely, in the pumping mode, electric energy fed to stator 130 will create a rotating electrical field which will cause rotor 132 to rotate relative to stator 130. This will in turn cause the rotation of runner 116 which will displace or pump water in passageway 110 from outlet port 114 to inlet port 112.

As can be readily appreciated, proper operation of unit 100 requires turbine shaft 140—to which are attached turbine runner 116 at one end 142 of shaft 140 on the side of downstream end 106, and generator 126 at an opposed end 144 on the side of first end 104—to be positioned and supported both vertically (i.e., in the direction of axis 102) and laterally or radially (i.e., in a direction essentially perpendicular to axis 102) relative to passageway 110. In that regard and referring also to FIG. 3, unit 100 is supported and guided vertically by means of a thrust bearing 146 which can be placed at any convenient location along shaft 140. However, lateral or radial support is provided by at least two supporting means to prevent lateral or radial displacement of ends 142, 144 of shaft 140, and to prevent the rotation of shaft 140 out of concentricity with axis 102.

These two lateral supporting means are commonly referred to as a turbine guide bearing and a generator guide bearing to designate the two bearings located one near the turbine and the other near the generator, respectively. Referring to FIG. 2, turbine guide bearing is identified as 148, and generator guide bearing as 150. These bearings could be of fully circular construction; alternatively, for various considerations the bearings could be formed of individual sectors or segments disposed at discrete locations around shaft 140, using "shoe-type" bearings for example.

It should be understood, however, that lateral support could also be provided by means other than bearings, using for example bushings, sleeves, shoes, or blocks of suitable design, dimension, and material, or like structures configured to provide lateral support to the shaft 140. These bearings and other structures will sometimes be referred to in this application as "lateral supporting means" or alternatively "lateral guiding means".

To contain and guide the water as desired, unit 100 typically includes several water closure components or covers generally designated as 152, 154, 156, disposed at selected areas along shaft 140. As shown on FIG. 2, turbine guide bearing 148 is received within cover 152 which also houses a shaft seal 157 and associated framing supports. Water closure component 154, which in certain cases may comprise a plurality of sections depending on the length of shaft 140, is configured to receive an intermediate portion of shaft 140.

Figure 3:
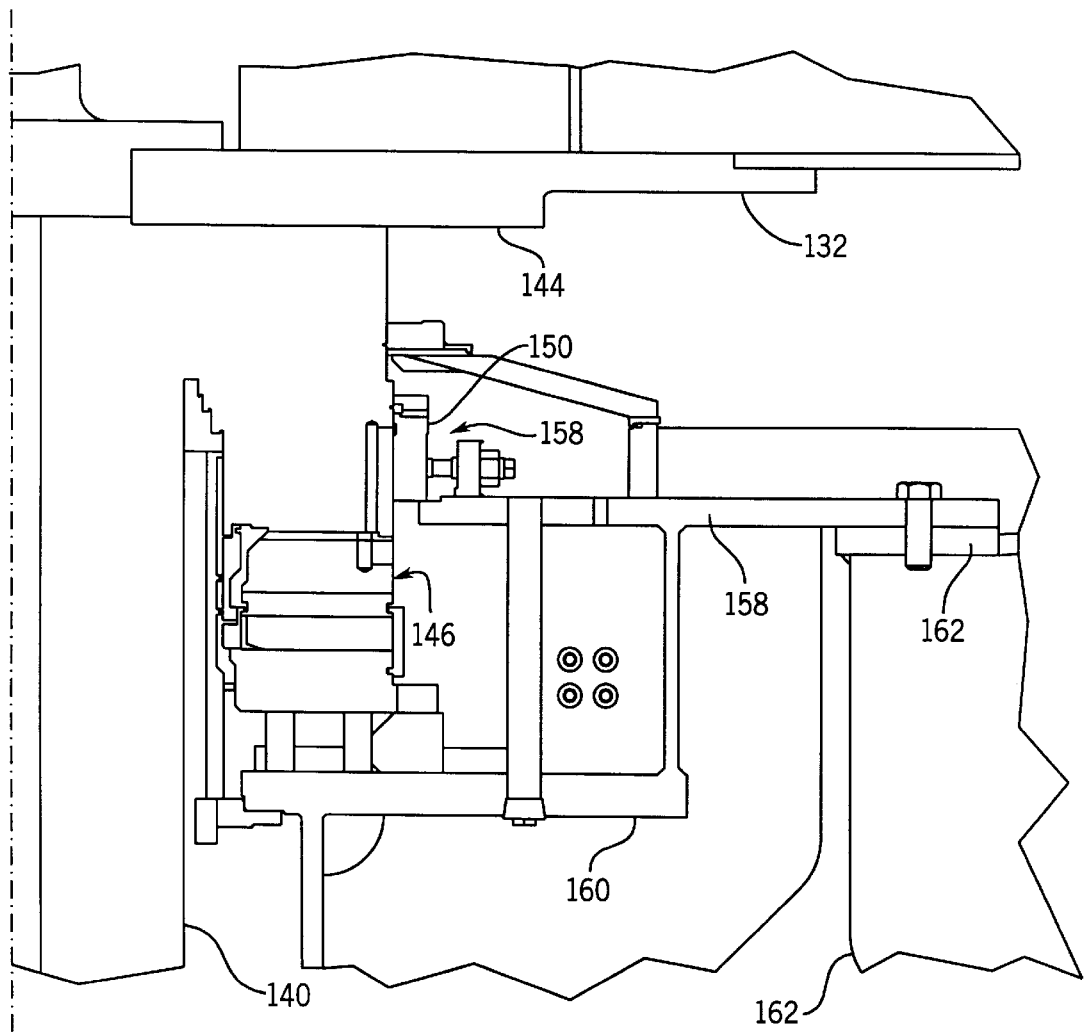
FIG. 3 in an enlarged front elevational view of the head cover in accordance with the present invention.

With reference now to FIGS. 2 and 3, rotor 132 is laterally supported by generator guide bearing 150 which is attached via suitable framing generally designated as 158 to water closure component 156, the latter often also called the turbine head cover. Accordingly, the integral configuration of the present invention by which the non-rotating portion of generator guide bearing 150 is attached to a turbine water closure component allows the elimination of dedicated brackets and bridges commonly located intermediate the turbine and the generator. It should be noted, however, that in this embodiment of the present invention thrust bearing 146 is also attached to head cover 156. As discussed earlier, thrust bearing 146 could alternatively be mounted at any other appropriate location along shaft 140 without departing from the scope of the present invention.

Head cover 156 also includes a bearing support and basin 160 which advantageously consists of framing supports attached to head cover 156 to anchor and support thrust bearing 146 and the non-rotating section of generator lateral guide bearing 150. Head cover 156 further includes various brackets or plates 162 inter-connecting head cover 156 to deck 136. As shown in FIG. 2, head cover 156 may be advantageously attached along the lower region 138 of deck 136.

As a result and as illustrated in FIG. 2, generator lateral supporting means 150, which is mounted on shaft 140 at end 144 and attached to turbine water closure component 156, forms an integral part of turbine 108. Also, because generator lateral supporting means 150 is attached to turbine water closure component 156, in accordance with the present invention turbine closure component 156 will be disposed closer to first end 104 of installation 100 than to downstream end 106. This also means that generator lateral supporting means 150 will be located proximate rotor 132 and inlet port 112. Stated another way, unlike in prior art machines, inlet port 112 will be located closer to generator 126 than to outlet port 114, thereby significantly decreasing the size of deck 136 and its complexity, and reducing the cost to construct unit 100.

Although the foregoing description is that of a preferred embodiment of the present invention, it should be understood that this invention is not limited to the specific forms described. For example, generator guide bearing 150 could take other forms and be attached to turbine water closure component 156 in other ways. Similarly, turbine water closure component 156 could be attached to deck 136 in ways other than that illustrated and described herein. In addition, the turbine water closure components, the turbine itself, and other components of the installation could take other forms or be disposed in the passageway in different ways. Such other constructions ares nevertheless, considered to be within the scope of this invention. Accordingly, these and other substitutions, modifications, changes and omissions may be made in the design and arrangement of the elements as disclosed herein without departing from the scope of the appended claims.

We claim:

1. A hydroelectric installation having a longitudinal axis extending between a first end and an opposed downstream end, the installation comprising:
   a. a turbine rotatable within a passageway through which water flows between an inlet port and an outlet port, the turbine comprising:
      a runner having a plurality of blades, the runner being disposed in the passageway intermediate the inlet and outlet ports;
      a turbine head cover connected to the passageway proximate the inlet port; and
      a turbine guiding means disposed intermediate the runner and the turbine head cover;
   b. a generator having a rotor connected to the turbine and an associated stator disposed outside the passageway proximate the inlet port; and
   c. means for providing lateral support to the generator, the generator lateral supporting means being supported by the turbine head cover.

2. The hydroelectric installation of claim 1, wherein the generator lateral supporting means is attached to the turbine head cover.

3. The hydroelectric installation of claim 1, wherein the generator lateral supporting means is housed within the turbine head cover.

4. The hydroelectric installation of claim 3, wherein the turbine head cover includes a bearing support and basin connected to an upper region of the head cover and configured to receive the generator lateral supporting means.

5. The hydroelectric installation of claim 1, further including a shaft extending from the runner to the generator, the generator lateral supporting means being rotatably mounted on the shaft.

6. The hydroelectric installation of claim 1, wherein the turbine head cover is disposed at the first end of the installation.

7. The hydroelectric installation of claim 6, wherein the turbine head cover is disposed closer to the first end of the installation than to the downstream end of the installation.

8. The hydroelectric installation of claim 1, wherein the axis is vertically oriented.

9. The hydroelectric installation of claim 1, wherein the turbine is one selected from a group consisting of a propeller turbine, a radial flow turbine, a mixed flow turbine, an impulse turbine, and a reversible pump turbine.

10. The hydroelectric installation of claim 1, wherein the turbine is a Kaplan turbine.

11. The hydroelectric installation of claim 1, wherein the turbine is one selected from a group consisting of an axial flow pump, a diagonal flow pump, and a centrifical pump.

12. An integrated hydroelectric unit comprising:
    a turbine mounted on a turbine shaft, the turbine comprising a runner having a plurality of runner blades, the runner being rotatably disposed within a passageway in which water flows between an upper elevation source in fluid communication with an inlet port and a lower elevation outlet port, the turbine also including at least one water closure component to prevent the water from entering selected areas of the turbine; and
    a generator disposed outside the passageway, the generator being connected to the turbine and laterally supported by a generator guide bearing attached to the at least one water closure component thereby eliminating the use of dedicated generator guide bearing brackets, bridges or frames.

13. The hydroelectric unit of claim 12, wherein the at least one water closure component is a head covers.

14. The hydroelectric unit of claim 12, wherein the at least one water closure component is attached to a deck supporting a stator of the generator, the deck extending to the inlet port of the passageway.

15. An integrated hydroelectric unit comprising:
    a turbine having a turbine shaft and a runner mounted thereon, the runner including a plurality of runner blades connected thereto, the runner being rotatably disposed within a passageway in which water flows between an upper elevation source in fluid communication with an inlet port and a lower elevation outlet port, the turbine also including a water closure component to prevent the water from entering selected areas of the turbine; and
    a generator disposed outside the passageway, the generator having a stator and an associated rotor, the stator being vertically supported on an upper surface of a deck having a lower region, the lower region of the deck forming the inlet port, the rotor being laterally supported by a generator guide bearing attached to the water closure component.

16. The hydroelectric unit of claim 15, wherein the water closure component is a turbine head cover.

17. The hydroelectric unit of claim 15, wherein the generator guide bearing is housed within the water closure component.

18. The hydroelectric unit of claim 15, further including a thrust bearing, the thrust bearing being attached to the water closure component.

19. The hydroelectric unit of claim 17, further including a thrust bearing housed within the water closure component.

20. The hydroelectric unit of claim 15, wherein the water closure component is attached to the lower region of the deck.

21. The hydroelectric unit of claim 15, wherein the inlet port is closer to the generator than to the outlet port.

22. A method of laterally supporting a generator guide bearing of an integrated hydroelectric unit, the unit comprising a turbine having a turbine shaft and a runner mounted thereon, the runner having a plurality of runner blades, the turbine also including at least one water closure component to prevent water from entering selected areas of the turbine, the unit also including an electrical generator having a stator and associated rotor, the method comprising the steps of:

rotatably disposing the runner within the passageway in which the water flows between an upper elevation source and a lower elevation outlet port when the water is in fluid communication with an inlet port of the passageway;

attaching the at least one water closure component to the lower region of the deck;

coupling the rotor to the shaft for rotation therewith;

rotatably mounting a generator guide bearing on the shaft and attaching the generator guide bearing to the at least one water closure component for laterally supporting the rotor;

and functionally coupling the stator to the rotor, the stator being supported by a deck having a lower region forming the inlet port.

* * * * *